US011022520B2

(12) United States Patent
Simard et al.

(10) Patent No.: US 11,022,520 B2
(45) Date of Patent: Jun. 1, 2021

(54) OPTICAL TEST INSTRUMENT WITH REMOVABLE CARTRIDGE

(71) Applicant: EXFO Inc., Québec (CA)

(72) Inventors: Michael Simard, Boischatel (CA);
Kristine Palanjyan, Quebec (CA);
Stephane Perron, Quebec (CA)

(73) Assignee: EXFO INC., Quebec (CA)

( * ) Notice: Subject to any disclaimer, the term of this patent is extended or adjusted under 35 U.S.C. 154(b) by 99 days.

(21) Appl. No.: 16/553,964

(22) Filed: Aug. 28, 2019

(65) Prior Publication Data

US 2020/0116590 A1 Apr. 16, 2020

Related U.S. Application Data (60) Provisional application No. 62/744,161, filed on Oct. 11, 2018.

(51) Int. Cl.
*G01M 11/00* (2006.01)
*G01M 11/08* (2006.01)
(Continued)

(52) U.S. Cl.
CPC ....... *G01M 11/3109* (2013.01); *G01J 1/0271* (2013.01); *G01J 1/04* (2013.01);
(Continued)

(58) Field of Classification Search
CPC ........ G02B 6/38; G02B 6/3807; G02B 6/385; G02B 6/3887; G02B 6/389; G02B 6/3893;
(Continued)

(56) References Cited

U.S. PATENT DOCUMENTS

| 5,530,783 A | 6/1996 | Belopolsky et al. |
| 5,778,122 A * | 7/1998 | Giebel ................. G02B 6/3825 385/137 |

(Continued)

FOREIGN PATENT DOCUMENTS

| EP | 3304024 A1 | 4/2018 |
| JP | S63233346 A | 9/1988 |
| KR | 20160122594 A | 10/2016 |

OTHER PUBLICATIONS

One pair of 90 degrees fiber optic adaptyer cables to go 40016 velicity right angle toslink port saver adapter; AGW10; Cable adapter; DVI; Ali express : https://www.aliexpress.com/item/One-Pair-of-90-Degrees-Fiber-Optic-Adapter-Cables-T. (Jun. 5, 2018).
(Continued)

*Primary Examiner* — Gordon J Stock, Jr.

(57) ABSTRACT

An optical test instrument, in combination with a removable connector cartridge is provided. A method of replacing a damaged or worn optic fiber interface is also provided. The optical test instrument has casing having a cartridge receiving cavity therein with an inner end provided with a test instrument optical port; and an outer end provided with a cartridge receiving opening. The connector cartridge is sized and configured to be inserted in the cartridge receiving cavity. The connector cartridge has a cartridge inner end for facing the test instrument optical port when in use, and a cartridge outer end for receiving an optic fiber from a device under test (DUT). The connector cartridge houses a fiber optic cable extending between the cartridge inner end and the cartridge outer end. The connector cartridge is removably connectable to the instrument casing to allow replacement of the connector cartridge when the cartridge outer end is worn or damaged.

21 Claims, 7 Drawing Sheets

(51) Int. Cl.
*G02B 6/38* (2006.01)
*G01J 1/02* (2006.01)
*G01J 1/04* (2006.01)
*H04B 10/071* (2013.01)
*H04B 10/073* (2013.01)
*G02B 6/42* (2006.01)

(52) U.S. Cl.
CPC ...... *G01M 11/086* (2013.01); *G01M 11/3154* (2013.01); *G02B 6/385* (2013.01); *G02B 6/3807* (2013.01); *G02B 6/3887* (2013.01); *G02B 6/3897* (2013.01); *G02B 6/421* (2013.01); *G02B 6/4202* (2013.01); *H04B 10/071* (2013.01); *H04B 10/073* (2013.01)

(58) Field of Classification Search
CPC ...... G02B 6/3894; G02B 6/3897; G02B 6/42; G02B 6/4202; G02B 6/421; G02B 6/4216; G02B 6/4219; G02B 6/426; G02B 6/4285; G02B 6/4286; G02B 6/43; G01J 1/0271; G01J 1/04; G01J 1/0403; G01J 3/0218; G01D 5/35354; G01M 11/0207; G01M 11/086; G01M 11/30; G01M 11/3109; G01M 11/3118; G01M 11/3127; G01M 11/3136; G01M 11/3145; G01M 11/3154; G01M 11/3163; G01M 11/3172; G01M 11/3181; G01M 11/319; G01M 11/33; G01M 11/331; G01M 11/332; G01M 11/333; G01M 11/334; G01M 11/335; G01M 11/336; G01M 11/337; G01M 11/338; G01M 11/35; G01M 11/37; G01M 11/39; H04B 10/07; H04B 10/071; H04B 10/073; H04B 10/075; H04B 10/077; H04B 10/0771; H04B 10/0773; H04B 10/0775; H04B 10/0777; H04B 10/0779; H04B 10/079; H04B 10/0791; H04B 10/0793; H04B 10/0795; H04B 10/07951; H04B 10/07953; H04B 10/07955; H04B 10/07957; H04B 10/0797; H04B 10/0799

USPC ..................................................... 356/73.1
See application file for complete search history.

(56) References Cited

U.S. PATENT DOCUMENTS

| | | | | |
|---|---|---|---|---|
| 5,940,559 | A * | 8/1999 | Noll | G01M 11/33 385/53 |
| 6,174,178 | B1 * | 1/2001 | Reinhold | G02B 6/3897 439/131 |
| 6,733,185 | B2 * | 5/2004 | Zhao | G02B 6/3823 385/55 |
| 6,926,449 | B1 * | 8/2005 | Keenum | G02B 6/3897 385/135 |
| 7,373,069 | B2 * | 5/2008 | Lazo | G01M 11/30 385/134 |
| 8,480,310 | B2 * | 7/2013 | Kewitsch | G02B 6/3825 385/73 |
| 8,985,869 | B1 * | 3/2015 | Peng | G02B 6/29364 385/88 |
| 9,568,701 | B2 * | 2/2017 | Czosnowski | G02B 6/125 |
| 9,654,213 | B2 | 5/2017 | Ruchet et al. | |
| 9,857,540 | B2 * | 1/2018 | Ahmed | G02B 6/3887 |
| 9,900,087 | B2 | 2/2018 | Ruchet | |
| 9,980,021 | B2 | 5/2018 | Oltman et al. | |
| 10,260,989 | B2 * | 4/2019 | Hallett | G01M 11/30 |
| 10,488,597 | B2 * | 11/2019 | Parikh | G02B 6/3809 |
| 2004/0170369 | A1 | 9/2004 | Pons | |
| 2015/0002837 | A1 | 1/2015 | Benjamin | |
| 2015/0063761 | A1 * | 3/2015 | Hallett | G02B 6/3846 385/86 |

OTHER PUBLICATIONS

AN-137 Preventing damage to optical connectors; OptoTest Corporation Headquarters 4750 Calle Quetzal Camarillo, CA 93012 USA; https://www.optotest.com/137-preventing-damage-optical-connectors/#. (Aug. 1, 2016).

* cited by examiner

OPTICAL TEST INSTRUMENT WITH REMOVABLE CARTRIDGE

RELATED PATENT APPLICATION

This application claims priority on U.S. Provisional Patent Application Ser. No. 62/744,161 entitled "Optical Test Instrument with Removable Cartridge", which was filed on Oct. 11, 2018 and which content is incorporated therein.

TECHNICAL FIELD

The technical field generally relates to optical test devices and instruments, and more particularly, to a removable connector cartridge for use in combination with an optical test instrument.

BACKGROUND

Different types of optical test instruments and measurement devices are available to verify and measure parameters of optical signals, which can be indicative of the state and performance of optical fibers or of optical switching, repeater or interconnecting devices in a network. Optical test instruments include optical time-domain reflectometers (OTDRs) and optical power meters, stated as examples only.

Repeated connection and disconnection of fiber connectors between the devices under test (DUT) and the test instrument connectors may lead to wear of the test instrument's connectors and/or optic fiber interfaces over time. In addition, the output connectors on test instruments are often exposed. Therefore, dust, particles or oil contamination (from fingerprints) can affect the interface of the connector and/or optic fibers. The degradation of optical output connectors can lead to increased initial dead zone, reduced measurement range and increased measurement uncertainty. Preserving the cleanliness and integrity of the optical connectors of test instruments is critical, since damaged connectors or wear and dust on optical fiber interfaces can increase loss and reflections, which affect the accuracy of the measurements. As such, when optical connectors on test instruments are worn or damage, they must be replaced, which involves sending the instrument to a repair center, which can be costly and prevents technicians and engineers from using their tool while the instrument is being repaired.

One known solution to this issue is to leave "saver cables" connected to optical test instruments. Optical fiber cables are left connected to the test instruments almost permanently until the interface of the "saver cable" becomes damaged, at which point the cable is replaced or repolished. This solution is however unpractical, since it means leaving a dangling cable attached to the test instruments. In addition, improper "saver cables" can be mistakenly connected to the test instruments, resulting in inaccurate measurements.

Based on the foregoing, challenges remain in preserving the integrity of test instruments' optical ports and connectors, and in facilitating their replacement when required.

SUMMARY

According to an aspect, an optical test instrument is provided. The optical test instrument comprises an instrument casing, including measurement components therein. The optical test instrument can be for example an optical time domain reflectometer (OTDR), a power meter, an Optical Spectrum Analyzer (OSA), a Variable Attenuator (VOA), and a WDM or CWDM optical channel checker. In some embodiments, the optical instrument is a handheld portable test instrument for measuring parameters of at least one optical signal.

The instrument casing has a cartridge receiving cavity extending within. The cartridge receiving cavity has an inner end provided with a test instrument optical port and an outer end provided with a cartridge receiving opening. The opening is located on the instrument casing. The test instrument also comprises a connector cartridge, sized and configured to fit in the cartridge receiving cavity.

The connector cartridge has a cartridge inner end, which faces said test instrument optical port when inserted, and a cartridge outer end which receives an optic fiber from a device under test (DUT), when in use. The connector cartridge houses at least one fiber optic cable, or optical link, extending between the cartridge inner end and the cartridge outer end, the connector cartridge being removably connectable to the instrument casing to allow replacement of the connector cartridge when the cartridge outer end is worn or damaged.

In some embodiments, the connector cartridge comprises a first connector at the cartridge inner end, for interfacing with the test instrument optical port of the optical test instrument and a second connector at the cartridge outer end, for interfacing with a DUT connector; the fiber optic cable extending between the first and second connectors. wherein the fiber optic cable is bent at least once within the connector cartridge. The fiber optic cable is preferably a bend insensitive fiber optic cable and may comprise a single-mode or multimode optic fiber. The first and second connectors preferably have a reduced length, such as between about 30 mm and about 50 mm, compared to standard-sized optical connectors.

In some embodiments, the cartridge outer end is provided with a DUT connector adapter having an outer side and an inner side. The outer side of the DUT connector adapter is for receiving a connector from the DUT, while the inner side of the DUT connector adapter is for receiving the second connector of the fiber optic link. When the test instrument is in use, and the connector cartridge is inserted in the test instrument, the outer side of the DUT connector adapter preferably extends outside of the instrument casing, while the remainder of the connector cartridge is housed inside the cartridge receiving cavity.

In some embodiments, the cartridge casing can include internal sidewalls and/or flanges sized and configured to frictionally engage with the first and/or the second connectors. The first and second connectors can be of different types, including angled physical contact (APC) connectors and ultra-physical contact (UPC) connectors. The first and second connectors can be one of SC, LC, FC and MTP/MTPO connectors, the fiber optic cable being a single fiber or multi-fiber fiber cable.

In some embodiments, the connector cartridge casing can include one or more winding guides, to receive or retain bent portions of the fiber optic cable housed therein. Different configurations of winding guides are possible, for example they can be arched, S-shaped or C-shaped or can consists of tabs spaced away from a lateral sidewall of the connector cartridge.

The connector cartridge is preferably removable or replaceable from the test instrument without the use of any tools. For example, the cartridge casing can be provided with a resilient clip near its outer end, allowing toolless insertion and removal of the cartridge from within the instrument casing.

According to another aspect, the fiber optic connector cartridge is provided, for use in combination with an optical test instrument. The connector cartridge houses an optical link, and the cartridge is removably connectable to the optical test instrument, allowing replacement thereof when optic fiber interfaces of the connector cartridge are damaged or worn. More specifically, the optical connector cartridge comprises a cartridge casing, sized and configured to fit in the cartridge receiving cavity extending within the optical test instrument. The cartridge casing has opposed inner and outer ends, the outer end being provided with a DUT connector adapter, for receiving a connector from the DUT. A fiber optic cable is housed within the cartridge casing, the fiber optic cable comprising a first connector and a second connector, and a bend insensitive fiber optic link extending therebetween. The first connector being configured for interfacing with an optical port inside the test instrument, while the second connector of the fiber optic cable is received at the inner side of the DUT connector adapter. When inserted in the test instrument, the other/outer side of the DUT connector adapter preferably extends at least partially out of the test instrument casing. The connector cartridge is removably and toollessly connectable to the optical test instrument, allowing replacement thereof when optic fiber interfaces of the connector cartridge are damaged or worn.

According to yet another aspect, a method of replacing a damaged or worn DUT optic fiber interface of an optical test instrument is provided. The method comprises the steps of removing a connector cartridge comprising the damaged or worn DUT optic fiber interfaces from the optical test instrument by sliding the cartridge out of a cartridge cavity provided in the optical test instrument; and inserting a replacement connector cartridge including an undamaged DUT optic fiber interface by sliding the replacement cartridge in the cartridge cavity of the optical test instrument.

DETAILED DESCRIPTION

In the following description, similar features in the drawings have been given similar reference numerals and, to not unduly encumber the figures, some elements may not be indicated on some figures if they were already identified in a preceding figure. It should be understood herein that the elements of the drawings are not necessarily depicted to scale, since emphasis is placed upon clearly illustrating the elements and structures of the present embodiments. It should also be noted that positional descriptors such as up and down, inner and outer, and other like terms indicating the position or orientation of one element with respect to another element are used herein for ease and clarity of description and should, unless otherwise indicated, be taken in the context of the figures and should not be considered limiting. It will be understood that such spatially relative terms are intended to encompass different orientations in use or operation of the present embodiments, in addition to the orientations exemplified in the figures.

In the present description, and unless stated otherwise, the terms "connected", "coupled" and variants and derivatives thereof refer to any connection or coupling, either direct or indirect, between two or more elements. The connection or coupling between the elements may be mechanical, physical, operational, electrical or a combination thereof.

It is also noted, and unless otherwise mentioned, that terms such as "substantially" and "about" which modify a value, condition or characteristic of a feature of an exemplary embodiment, should be understood to mean that the value, condition or characteristic is defined within tolerances that are acceptable for proper operation of this exemplary embodiment for its intended application.

The present description generally relates to an optical connector cartridge which can be removably connected to or fitted in an optical test instrument, to preserve the optical port of the test instrument. The optical connector cartridge can thus be removed or replaced by the end users, to replace a damage or worn fiber end, or to receive different types of DUT optical connectors. The optical connector cartridge comprises two connectors and an optical link extending between the connectors. The optical link can be a single or multi-fiber cable. The fiber under test can be single-mode or multi-mode types. One of the connectors interfaces with an optical cable or connector of a Device Under Test (DUT), either directly or indirectly, and the other connector interfaces with an optical port or connector of the test instrument. The optical connector cartridge can also be referred to as an optical connector cassette; a fiber optic connector cartridge; or a connector saving cassette, since it allows for preserving or extending the lifetime of optical ports of test instruments. The description also relates to the optical test instrument that receives or interfaces with the connector cartridge, and to a method for replacing the connector cartridge from the test instrument.

Figure 1:
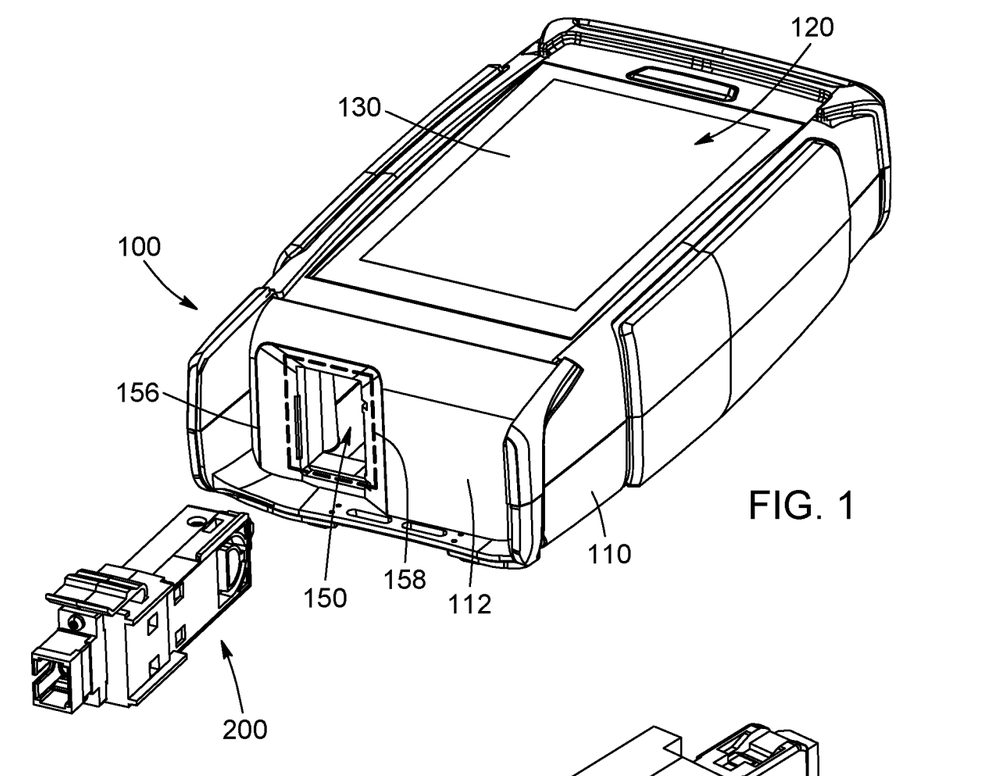
FIG. 1 is a perspective view of an optical test instrument and of its connector cartridge, according to a possible embodiment.

Referring now to FIG. 1, an optical test instrument (100) is illustrated, according to a possible embodiment. In this exemplary embodiment, the optical test instrument (100) is an Optical Time Domain Reflectometer (ODTR), but it should be noted that the present description applies to other types of test instruments, such as power meters, Optical Spectrum Analyzers (OSA), Variable Attenuators (VOA), and Wavelength-Division Multiplexing (WDM) or Coarse Wavelength-Division Multiplexing (CWDM) optical channel checkers for monitoring WDM channels on optical fiber links and/or for measuring optical power of individual channels, as examples only. In fact, the optical connector cartridge (200) can be used with any type of optical test instrument that interfaces with optical links or fiber optic cables, to test or qualify the fiber, such as pass/no-pass test; or with optical test instruments that measure optical parameters based on the signal transiting through the optical link. In some embodiments, the optical test instrument is a portable optical test instrument, meaning that the test instrument can be transported by an engineer or technician to test, characterize or measure optical signals from different types of devices under test. Yet still, the optical test instrument can be a handheld portable optical test instrument, provided with a display or other visual (or sound) indicators, for providing feedback on the status of the optical signals being monitored.

The optical test instrument (100) is provided with an instrument casing (110), which houses and protects different components necessary for the working of the instrument, such as measurement components (120), including for example, switches, mirrors, transceivers, amplifiers, microprocessors, optical processors, storage memory and the likes. The casing (110) can be made of one or several casing sections, of different materials, such as for example shock resistant molded plastic. The casing (110) is provided with a cartridge receiving cavity (150), which extends within the instrument casing (110). The cartridge receiving cavity (150) preferably extends with the casing (110) to hide most of the connector cartridge (200) when inserted therein. In other embodiments though, it can be considered that the optical connector cartridge (200) be entirely received within the cavity (150), without any portion of the cartridge extending outside the test instrument (100). Yet in other embodiments, it can also be considered that the connector cartridge (200) extends for its most part outside the test instrument (100).

Figure 2:
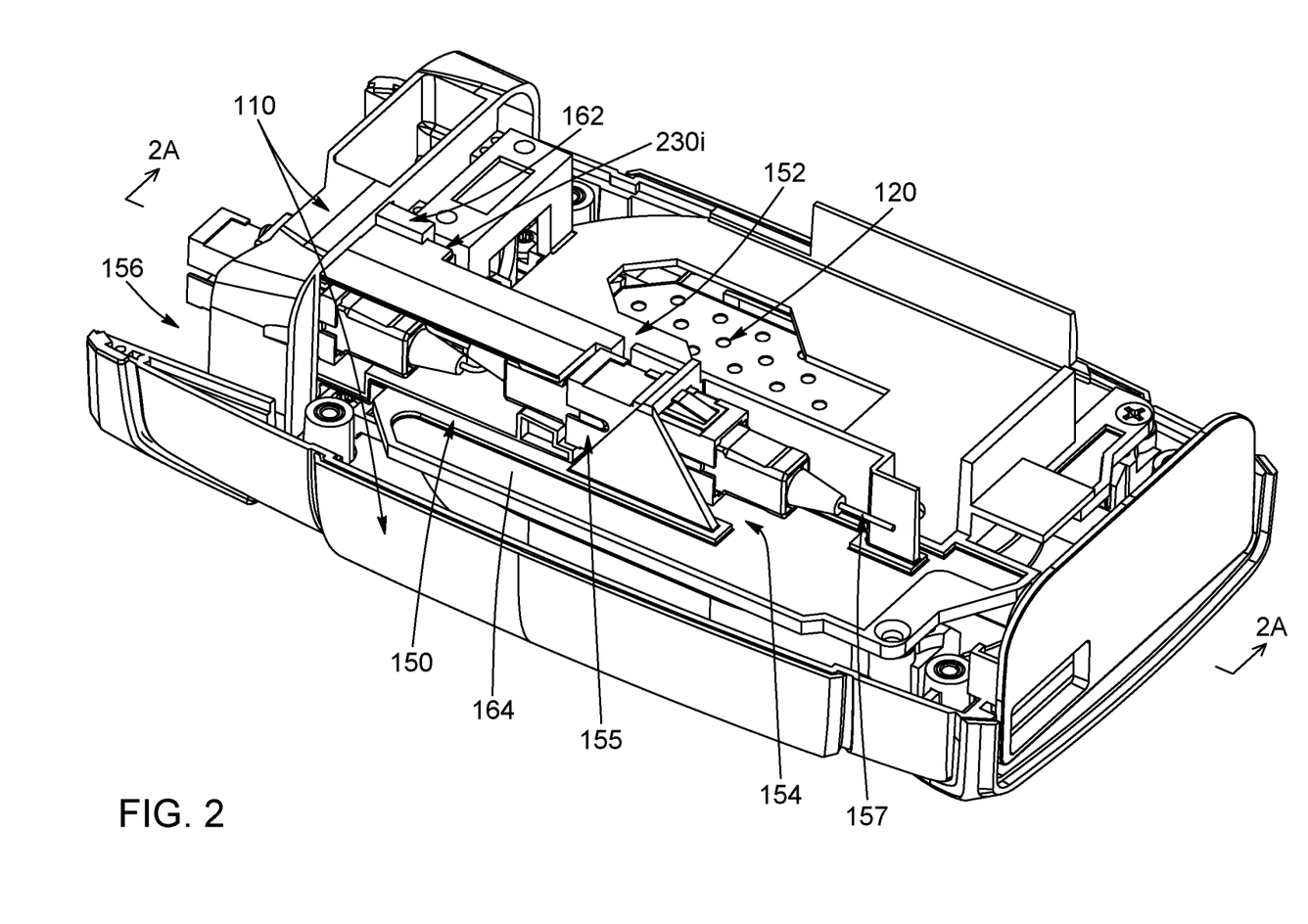
FIG. 2 is a top perspective view of the test instrument shown partially open, with the connector cartridge of FIG. 1 inserted in the optical test instrument.

Still referring to FIG. 1, and also to FIG. 2, the cartridge receiving cavity (150) has an inner end (152) provided with, or connected to, a test instrument optical port (154) and an outer end (156) provided with a cartridge receiving opening (158), said opening being located on the instrument casing (110), while the inner end is located inside the instrument casing. The cartridge receiving cavity (150) does not need to be defined by sidewalls; it is simply the region or area within the test instrument which can receive the optical connector cartridge (200).

The cartridge receiving cavity (150) can be provided on any side of the optical test instrument (100), but for practical reasons, in the illustrated embodiment, the cartridge receiving cavity (150) is provided at the top end (112) of the casing (110), when a user holds the instrument to look at the display (130). Optical test instruments are typically provided with displays, for displaying parameters of the optical signals measured by the measurement components of the test instrument (100), but the display is optional. Different types of indicators can be provided instead, such as an on/off LED or small speakers emitting sound signals, which can be indicative of the state of the DUT or optical fiber being tested. In yet other embodiments, the optical measurements can be transmitted to a distinct processing device, such as a smart phone or tablet.

Figure 1A:
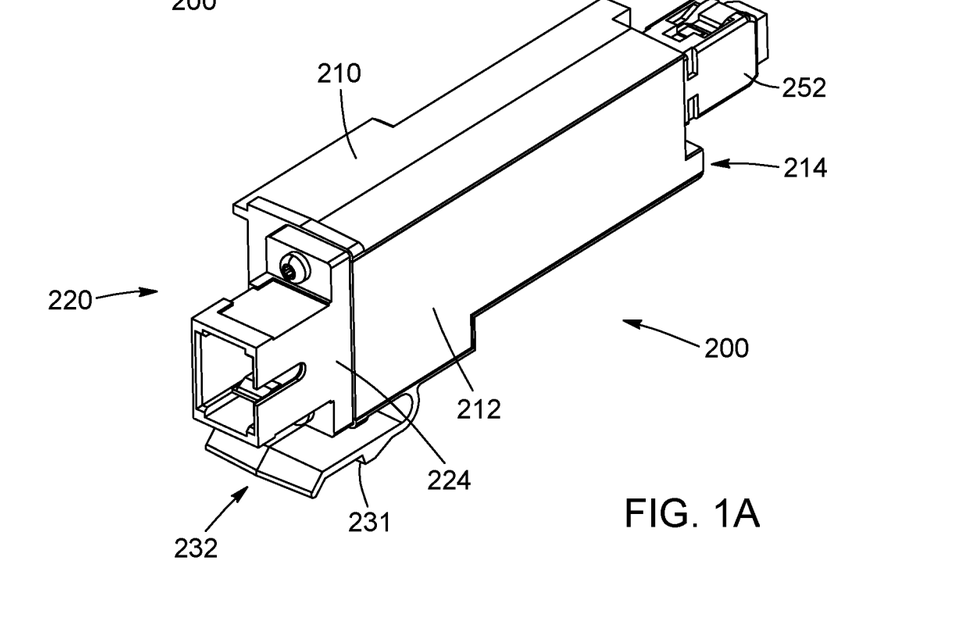
FIG. 1A is an enlarged view of the connector cartridge of FIG. 1.

Referring now to FIG. 1A, the connector cartridge (200) is sized and configured to fit in the cartridge receiving cavity (150). The connector cartridge (200) has a cartridge inner end (214) which faces the test instrument optical port (154) when inserted, and a cartridge outer end (220), which receives or interfaces with an optic fiber or fiber optic cable, from a device under test (DUT). The connector cartridge (200) houses at least one fiber optic cable (256)—identified and best shown in FIGS. 1B and 3B—extending between the cartridge inner end (214) and the cartridge outer end (220). The connector cartridge (200) is removably connectable to the test instrument, and more specifically to the instrument casing (110), to allow replacement of the connector cartridge (200), such as when the cartridge outer end (220) is worn or damaged. Preferably, end users can install and uninstall the cartridge from the test instrument using their fingers only, without any tool. The connection of the cartridge to the test instrument should however be robust enough to avoid unintended disconnection of the cartridge when in use.

Figure 1B:
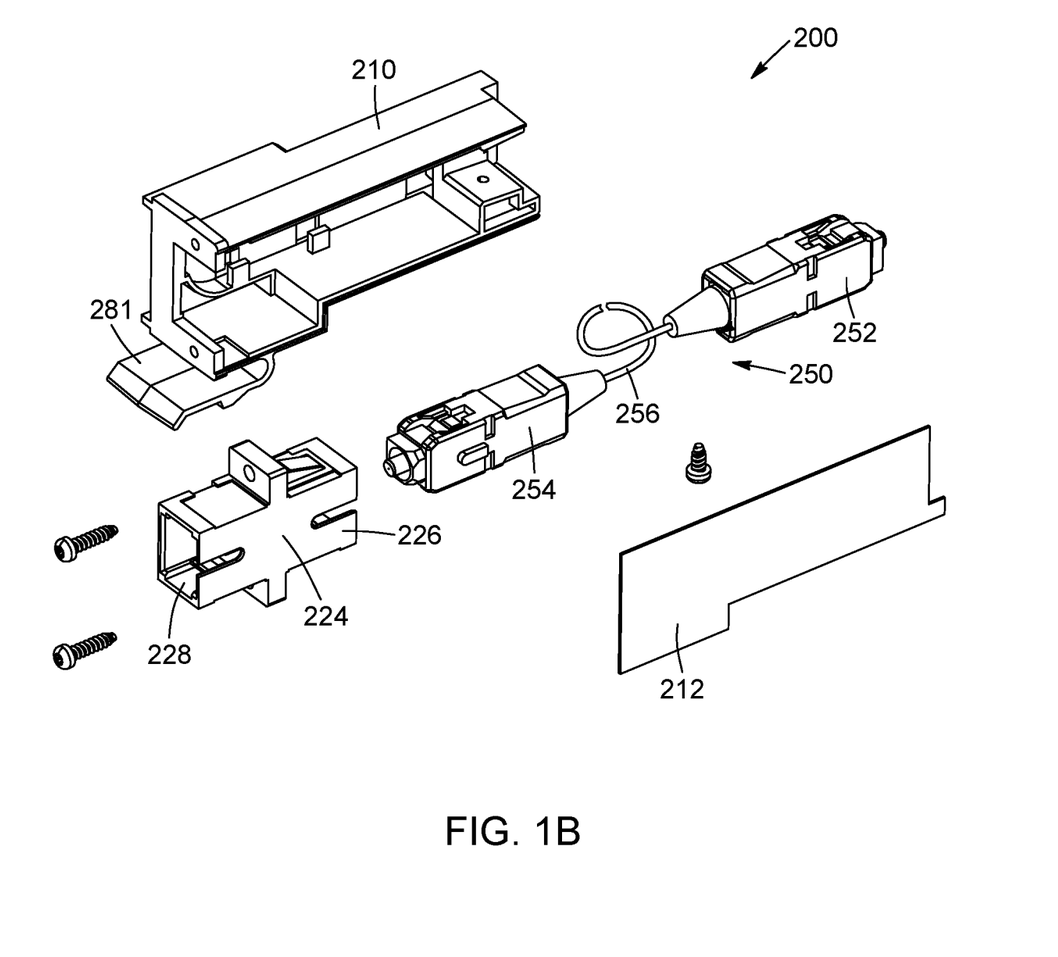
FIG. 1B is an exploded view of the connector cartridge of FIG. 1A.

Still referring to FIG. 1A, and also to FIG. 1B, the connector cartridge (200) is provided at its outer end with a connector adapter or connector receptacle (224), to receive the connector therein and the fiber optic cable from the DUT. The optical connector cartridge (200) comprises a cartridge casing (210), which is made in the illustrated embodiment from a single molded plastic part, closed on one of its lateral sides by a sticker (212). Other closing means or arrangements are possible, for example, it can be considered for the optical connector cartridge (200) to be left partially open on its side or to close it with another lateral sidewall section. In the embodiment illustrated, the cartridge casing (210) has a substantially rectangular shape, but other shapes and configurations are possible. In the embodiments shown, the optical connector cartridge or cartouche has an elongated cuboid shape reminiscent to a rectangular prism. Also visible in FIG. 2 is a clip (232), provided with a clip tab (231). When the optical connector cartridge (200) is inserted in the receiving cavity (150), the clip tab (231) engages with a corresponding recess in the casing (110) or another component of the test instrument, to connect and secure the cartridge (200) within the cavity (150). The clip (232) is slightly flexible or compressible, to allow disengagement of the clip tab (231) from the casing (110) for removal, when a user presses the clip. Other types of non-permanent connections can be considered, such as snap fit connections, male/female connectors, push buttons or even screws, just to name a few.

Figure 2A:
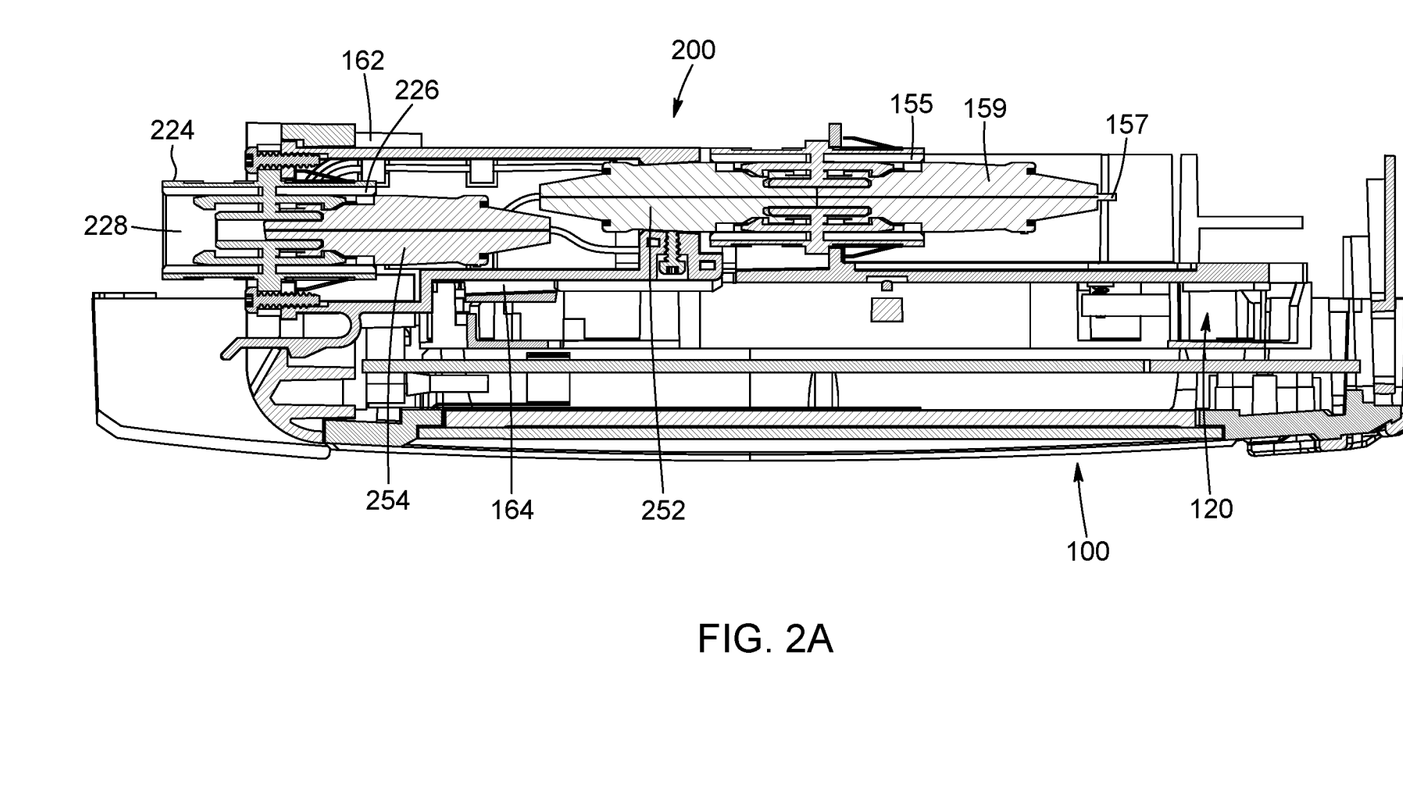
FIG. 2A is a partial cross-sectional view of the optical test instrument of FIG. 2.

Referring now to FIGS. 2 and 2A, a portion of the inside of the optical test instrument (100) is shown, with one of the casing sections removed. The cartridge receiving cavity (150) corresponds to the area of the casing in which the optical connector cartridge (200) fits. In the illustrated embodiment, the cartridge receiving cavity (150) is partially defined by a lower plate or partition (164) over which the cartridge casing (210) can slide, and by a flange (162), which receives or interfaces with a lip or flange (230i) of the connector cartridge (200). The cartridge receiving cavity (150) has a first (or inner) end (152), and second (or outer) end (156). Partially hidden under the plate (164) are the measuring and processing means (120) of the optical test instrument (100). The optical port (154) of the test instrument is also visible and includes an adapter (155) to receive on one side the end fiber extending out of the first connector (252) of the cartridge (200). The other side of the test instrument adapter (155) interfaces with a test instrument fiber cable (157), in this case via a test instrument connector 159, to transmit/send optical signals to/from the different measuring and processing components (120). In this embodiment, the connectors 252, 254 of the fiber optic link are offset one relative to the other, in the cartridge casing 210, so as to provide a compact cartridge, but other configurations are possible.

Figure 3A:
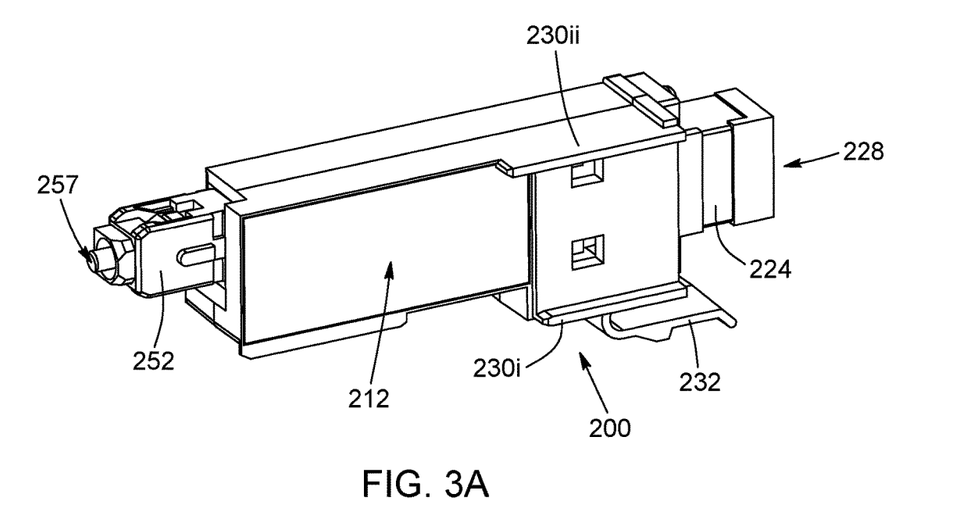
FIG. 3A is a side perspective view of the connector cartridge, according to a possible embodiment.
Figure 3B:
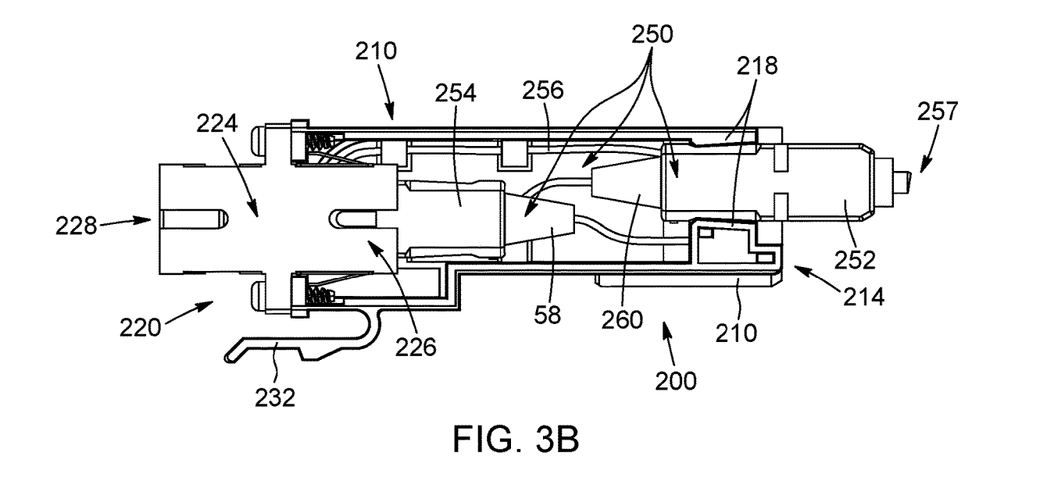
FIG. 3B is a side view of the connector cartridge, showing the interior of the connector cartridge.

FIGS. 3A and 3B show the fiber optic connector cartridge (200) from two opposed lateral views. According to possible embodiments, commercially available fiber optic patch cords (250) can be used, as in the illustrated example. Of course, different types of fiber optic cables can be used instead, with or without a protective layer or sheath. The fiber optic cable (256) can include a single optic fiber strand or multiple optic fiber strands. In the illustrative example of FIG. 3B, the fiber optic patch cord (250) is made of a first connector (252) at one end, for interfacing with the test instrument optical port or adapter of the optical test instrument; of a second connector (254) at the other end, for interfacing with the connector of a fiber optic cable from the DUT; and of a fiber optic cable (256) extending between the first and second connectors (252, 254). Preferably, the fiber optic cable (256) is a bend insensitive fiber optic cable. By "bend insensitive" it is meant that the fiber optic cable (250) can transmit light with minimum loss even if the cable is bent with a small bend radius. Bend insensitive fiber optic cables can include material of lower refraction index, provided to reflect the light back in the core of the optic fiber. The fiber optic cable can be single mode or multimode, and include a single optic fiber, or a plurality of optic fibers, such as 2, 8, 12, 24, etc. In other implementations, it can be considered for the fiber optic cable to extend substantially linearly between the first and second connectors (252, 254), or to be rolled or wind within the cartridge. Bending the optic fiber cable (250) within the cartridge allows minimizing the overall cartridge size. In the exemplary embodiment of FIG. 3B, the fiber is bend inside the cartridge, forming a first loop near the outer end (220), and forming another loop near the inner end (214), a portion of the loop extending through fiber slot (236) and wind around guide (234iv)—both features (236) and (234iv) being identified in FIG. 4B.

To further reduce the overall dimensions of the connector cartridge (200), the first and second connectors (252, 254) preferably have a reduced length, compared to standard-sized connectors (258, 260), for example between 30 and 50 mm. Such connectors are sometimes referred to as "mini boot" or "small boot" connectors. Of course, other types of connector boots are possible. The "boot" portion of the connectors is the inner connector portion identified by reference numbers (258, 260) in FIG. 3B. The first and second connectors (252, 254) can be angled physical contact (APC) connectors or ultra-physical contact (UPC) connectors, depending on the configuration needed for the end face (257) of the fiber. Other end face configurations are also possible. In addition, depending on the application, the first and second connectors (252, 254) can be standard connectors (SC), small form factor connectors, such as LC connectors, ferrule connectors, also referred to as "FC connectors"; and multi-fiber push on (MPO) connectors, as examples only.

Still referring to FIG. 3B, the cartridge (200) is provided with an adapter or "connector receptacle" (224). The adapter (224) has a first (inner) end (226) to receive the connector from the patch cord (250), and a second (outer) end (228), to receive the connector from a DUT optic fiber cable. The adapter (224) is secured to the casing (210) by means of screws and clips, but other securing means are possible, such as glue, for example.

The fiber optic cable can be either permanently affixed to the cartridge casing (210), or removably fitted in the casing (210), to allow replacement of the fiber and connectors (252, 254), rather than of the entire connector cartridge (200). Although for practical reasons, end users might prefer to replace the entire connector cartridge (200), such as for the embodiment shown, it can be considered to configure the casing such as to allow replacement of the optic fiber cable in the casing (210). In the illustrated embodiment, the patch cord (250) is glued to the casing (210). The cartridge casing (210) can include internal sidewalls and/or flanges (218)—identified in FIG. 3B—sized and configured to frictionally engage with the first and/or the second connectors (252, 254). Of course, other means to secure the connectors in the casing (210) are possible.

Still referring to FIGS. 3A and 3B, in order to facilitate the insertion and positioning of the connector cartridge in the test instrument, the cartridge casing (210) can be provided with lateral guiding flanges (230i, 230ii)—identified in FIG. 3A—that can mate with corresponding guiding slits or tabs (162)—identified in FIG. 2—to guide insertion and removal of the cartridge (200) from the cartridge cavity (150) of the instrument casing. Of course, such guiding means (230i, 230ii, 162) are optional and other configurations or arrangements are possible. Also shown on FIGS. 3A and 3B is the resilient clip (232), provided near the outer end (220) of the cartridge, allowing toolless insertion and removal of the cartridge from within the instrument casing. In the embodiment illustrated, the cartridge is made of a single part, made of molded plastic, having an open lateral side through which the fiber optic cable can be inserted. The cartridge casing (210) can be left opened, or can be closed with another casing section, or simply with a sticker, or any other closing means (212). End sides of the cartridge casing (214, 220) are open, to allow the adapter 224 and the connector (252) to extend outside of the casing (210). Of course, other casing configurations are possible. For example, the casing could be made of several casing sections affixed or clipped to one another.

Figure 4A:
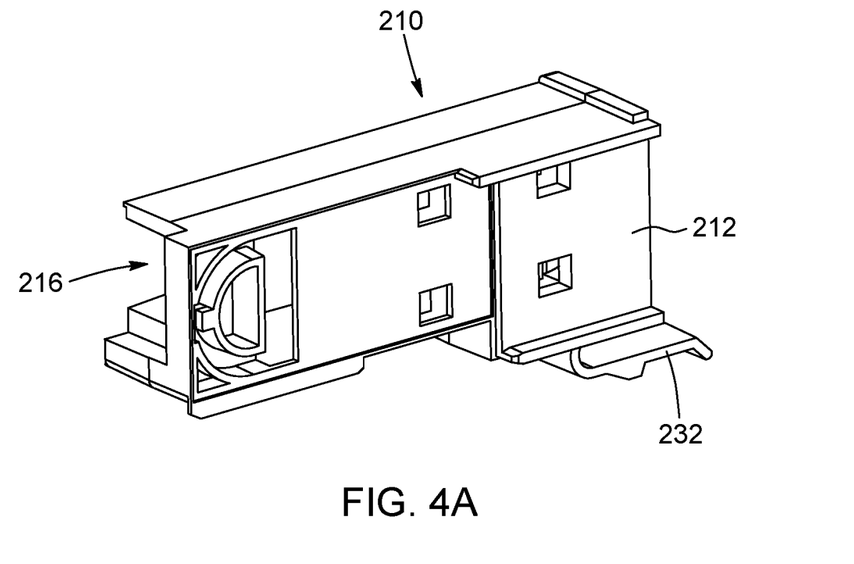
FIG. 4A is a side perspective view of a section of the connector cartridge casing, showing its outer side, according to a possible embodiment.
Figure 4B:
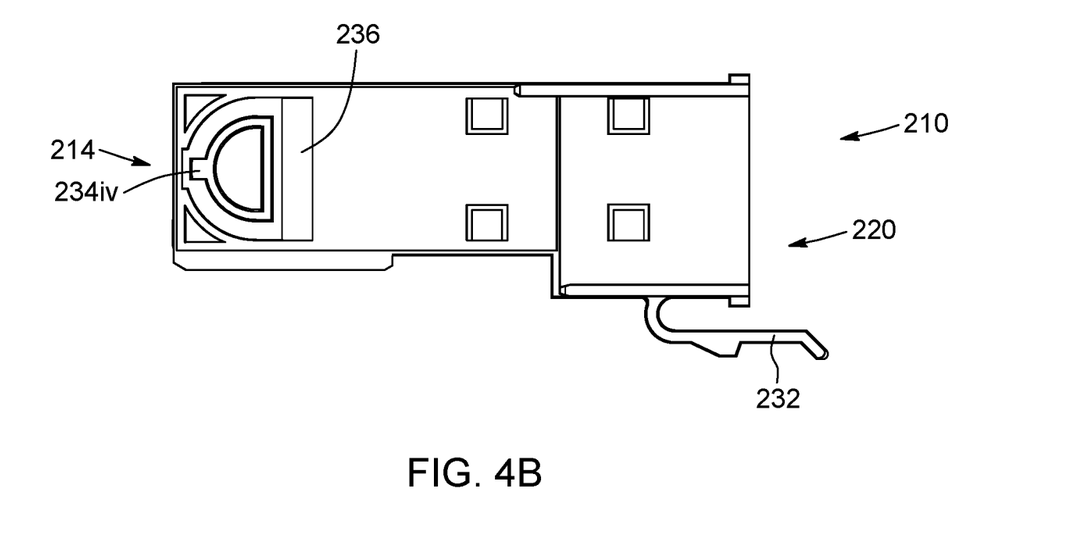
FIG. 4B is a side elevation view of the connector cartridge casing.
Figure 4C:
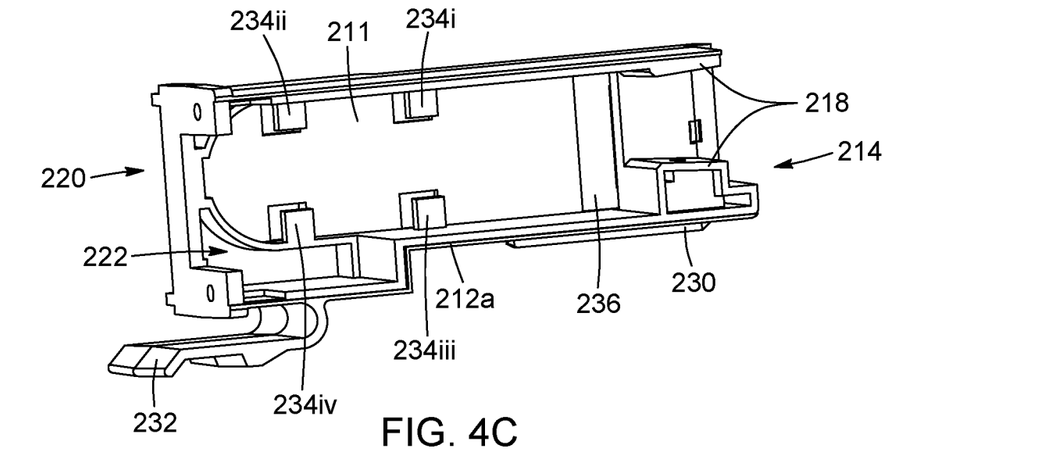
FIG. 4C is a side perspective view of the connector cartridge casing, showing its inner side, according to a possible embodiment.
Figure 4D:
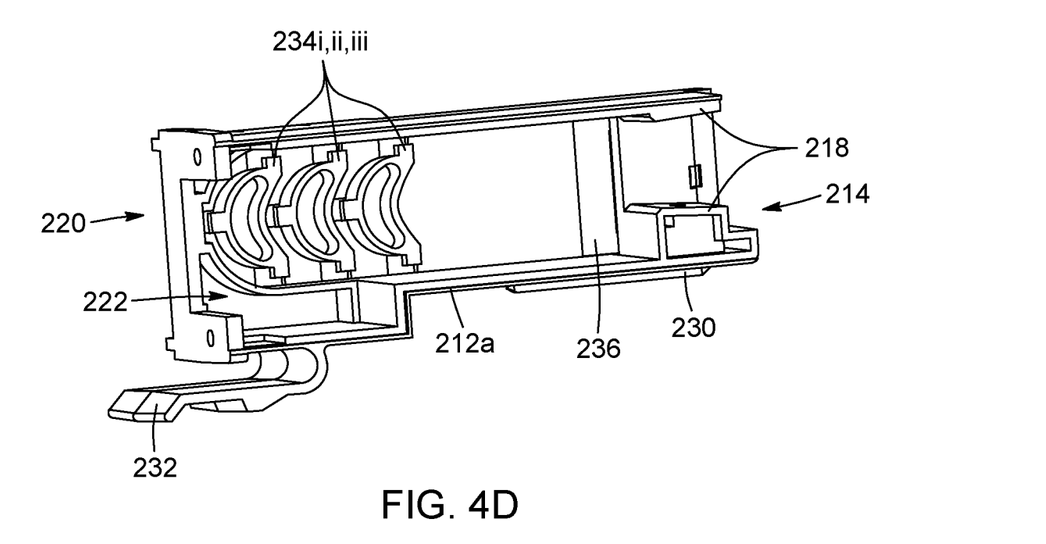
FIG. 4D is a side perspective view of a connector cartridge casing, according to another possible embodiment.

Referring now to FIGS. 4A to 4C, the cartridge casing (210) is shown from different points of view. FIG. 4D illustrates another possible embodiment of the casing (210). FIGS. 4C and 4D thus provides two different examples of winding guides, to facilitate placement of the optical cable in the cartridge. According to either embodiments of FIGS. 4C and 4D, the casing (210) is provided with winding guides (234i-234iv) for receiving bend portions of the fiber optic cable (256) housed therein. In the embodiment illustrated in FIG. 4D, the casing (210) is provided with three winding guides, which are formed by C-shaped protruding flanges, provided near the outer end (220) of the cartridge, to adapt to different lengths of fiber optic cables. In FIG. 4D, the winding guides (234i, 234ii 234 iii, 234iv) are provided as tabs spaced away from the lateral sidewall (211) of the connector cartridge casing (210). As such, the same casing design can be used for different fiber-size cartridges Although less practical, it would be possible to omit the winding guide(s), or to provide the casing with a single winding guide. Also, the winding guides can have other configurations, such as arch-shapes, S-shapes, circular shapes, tabs, etc. The fiber can thus be bent more than once within the casing, to maximize space usage inside the cartridge and provide a cartridge as small and compact as possible. As per the illustrated embodiment, a winding guide (234iv) near the inner end (214) of the cartridge can also be provided, on the outer or exterior side of the cartridge. In such configuration, it is best to form a fiber slot (236) in the lateral wall of the casing, for passing a portion of the fiber optic cable (256) therethrough, so that another bend portion of the fiber cable be supported by the winding guide (234iv) on the outer surface of the casing (210).

The test instrument (100) described above can be sold with a connector cartridge (200) already provided therein, and replacement connector cartridges (200) can be sold separately. The fiber optic connector cartridge (200) can thus be commercialized in combination with an optical test instrument, or independently of the test instrument, allowing replacement thereof when optic fiber interfaces of the connector cartridge are damaged or worn. Advantageously, the connector cartridge described therein provides increased versatility to the test instrument, since the test instrument input can be changed so as to allow receiving different connector types, and thus the same test instrument can be used with different connector cartridges, depending on the device being tested. In other words, the instrument input connector can be changed to easily adapt to the connector type of the DUT. It can also be considered to provide the optical test instrument with a set of different cartridges, each with different types of fibers and/or DUT connectors, so as to allow users to use the same optical test instrument for different types of optical devices being tested, by replacing the connector cartridge according to the DUT being tested.

As can be appreciated, with the above-described fiber optic connector cartridge for optical test instrument, it is possible to replace a damaged or worn DUT optic fiber interface of the optical test instrument. One simply needs removing the connector cartridge comprising the damaged or worn DUT optic fiber interfaces from the optical test instrument by sliding the cartridge out of a cartridge cavity provided in the optical test instrument; and inserting a replacement connector cartridge including an undamaged DUT optic fiber interface by sliding the replacement cartridge in the cartridge cavity of the optical test instrument. The described cartridge and optical test instrument allow end users to change faulty optical connectors without having to send their test instrument for repair, and the connector cartridge replacement can be made without any tool, and without having to open the test instrument.

Of course, numerous modifications could be made to the embodiments described above without departing from the scope of the present disclosure.

The invention claimed is:

1. An optical test instrument comprising:
   an instrument casing, including measurement components therein;
   a cartridge receiving cavity extending within the instrument casing, the cartridge receiving cavity having:
      an inner end provided with a test instrument optical port; and
      an outer end provided with a cartridge receiving opening, the opening being located on the instrument casing;
   a connector cartridge sized and configured to fit in the cartridge receiving cavity, the connector cartridge having:
      a cartridge inner end which faces the test instrument optical port, and
      a cartridge outer end which receives an optic fiber from a device under test (DUT), the connector cartridge housing a fiber optic cable extending between the cartridge inner end and the cartridge outer end, the connector cartridge being removably connectable to the instrument casing so as to allow replacement of the connector cartridge when the cartridge outer end is worn or damaged.

2. The optical test instrument according to claim 1, wherein the optical test instrument is one of an Optical Time Domain Reflectometer (OTDR), a power meter, an Optical Spectrum Analyzer (OSA), a Variable Optical Attenuator (VOA), and a WDM or CWDM optical channel checker.

3. The optical test instrument according to claim 1, wherein the optical instrument is a handheld portable test instrument for measuring parameters of at least one of optical signals, the optical test instrument comprising a display for displaying at least some of said parameters.

4. The optical test instrument according to claim 1, wherein the connector cartridge is provided with a resilient clip near its outer end, allowing toolless insertion and removal of the cartridge from within the instrument casing.

5. The optical test instrument according to claim 4, wherein the connector cartridge is provided with lateral guiding flanges, and wherein the instrument casing is providing with corresponding guiding slits or tabs, to guide the insertion and removal of the cartridge from the cartridge cavity of the instrument casing.

6. The optical test instrument according to claim 1, wherein the connector cartridge comprises:
   a first connector at the cartridge inner end, for interfacing with the test instrument optical port of the optical test instrument; a second connector at the cartridge outer end, for interfacing with a DUT connector; the fiber optic cable extending between the first and second connectors.

7. The optical test instrument according to claim 6, wherein the first and second connectors have a reduced length between about 30 mm and about 50 mm, compared to standard-sized optical connectors.

8. The optical test instrument according to claim 6, wherein the first and second connectors are angled physical contact (APC) connectors or ultra-physical contact (UPC) connectors.

9. The optical test instrument according to claim 6, wherein the first and second connectors are one of SC, LC, FC and MTP/MTPO connectors, the fiber optic cable being a single fiber or multi-fiber fiber cable.

10. The optical test instrument according to claim 6, wherein the cartridge outer end is provided with a DUT connector adapter having an outer side and an inner side, the outer side of the DUT connector adapter receiving a connector from the DUT, the inner side of the DUT connector adapter receiving the second connector, and wherein in use, the outer side of the DUT connector adapter extends outside of the instrument casing, while the remainder of the connector cartridge is housed inside the cartridge receiving cavity.

11. The optical test instrument according to claim 10, wherein the fiber optic cable and the first and second connectors are permanently affixed inside the casing cartridge.

12. The optical test instrument according to claim 10, wherein cartridge casing comprises internal sidewalls and/or flanges sized and configured to frictionally engage with the first and/or the second connectors.

13. The optical test instrument according to claim 6, wherein the fiber optic cable is bent at least once within the connector cartridge.

14. The optical test instrument according to claim 13, wherein the fiber optic cable comprises bend insensitive fiber optic cable and comprises a single-mode or multimode optic fiber.

15. The optical test instrument according to claim 14, comprising a fiber optic patch cord, the fiber optic cable being part of the fiber optic patch cord.

16. The optical test instrument according to claim 13, wherein the connector cartridge comprises one or more winding guides, receiving bend portions of the fiber optic cable housed therein.

17. The optical test instrument according to claim 16, wherein the one or more winding guides are arched, S-shaped or C-shaped or comprises tabs spaced away from a lateral sidewall of the connector cartridge.

18. The optical test instrument according to claim 16, wherein at least one of the winding guides is located near the inner end of the cartridge, and at least one winding guide is located near the outer end of the cartridge.

19. The optical test instrument according to claim 16, wherein the cartridge comprises lateral sidewalls, one of the lateral sidewalls being provided with a fiber slot for passing a portion of the fiber optic cable therethrough, said one lateral sidewall comprising one of the winding guides on its outer surface.

20. The optical test instrument according to claim 16, wherein the cartridge comprises at least two or more of the winding guides provided near the outer end of the cartridge, to adapt to different lengths of fiber optic cables.

21. A fiber optic connector cartridge, for use in combination with an optical test instrument, the test instrument receiving a fiber optical cable of a device under test (DUT), the connector cartridge comprising:
- a cartridge casing, sized and configured to fit in a cartridge receiving cavity extending within the optical test instrument, the cartridge casing having opposed inner and outer ends, the outer end being provided with a DUT connector adapter, for receiving a connector from the DUT;
- a fiber optic cable housed within the cartridge casing, the fiber optic cable comprising a first connector and a second connector, and a bend insensitive fiber optic link extending therebetween,
- the first connector being configured for interfacing with an optical port inside the test instrument;
- the second connector of the fiber optic cable being received at one side of the DUT connector adapter;
- the connector cartridge being removably and toollessly connectable to the optical test instrument, allowing replacement thereof when optic fiber interfaces of the connector cartridge are damaged or worn.

* * * * *